(12) United States Patent
Tsai

(10) Patent No.: US 7,537,397 B1
(45) Date of Patent: May 26, 2009

(54) OPTICAL-ISOLATION APPARATUS OF OPTICAL-FIBER CONNECTOR

(75) Inventor: Eden Tsai, Shulin (TW)

(73) Assignee: Comoss Electric Co., Ltd., Taipei (TW)

( * ) Notice: Subject to any disclaimer, the term of this patent is extended or adjusted under 35 U.S.C. 154(b) by 0 days.

(21) Appl. No.: 12/145,628

(22) Filed: Jun. 25, 2008

(51) Int. Cl.
*G02B 6/36* (2006.01)
*H04B 10/00* (2006.01)

(52) U.S. Cl. .............................. 385/92; 385/88; 385/89; 385/94; 439/577; 398/135; 398/138; 398/139; 398/136

(58) Field of Classification Search ................. 385/101, 385/53, 66, 84, 88, 89, 92, 94; 439/577; 398/135, 136, 138, 139
See application file for complete search history.

(56) References Cited

U.S. PATENT DOCUMENTS

| | | | |
|---|---|---|---|
| 5,879,173 A * | 3/1999 | Poplawski et al. ........... | 439/138 |
| 6,659,655 B2 * | 12/2003 | Dair et al. .................... | 385/92 |
| 6,873,800 B1 * | 3/2005 | Wei et al. ..................... | 398/138 |
| 7,290,945 B2 * | 11/2007 | Ahrens et al. ................. | 385/92 |
| 7,367,719 B1 * | 5/2008 | Liburdi ......................... | 385/92 |

* cited by examiner

*Primary Examiner*—Brian M Healy

(57) ABSTRACT

An optical-isolation apparatus of an optical-fiber connector is mainly applied in the optical transmission apparatus and the optical receiving module of the optical-fiber connector to isolate the optical transmission apparatus and the optical receiving module to prevent optical and electrical influences therebetween. Two electrically-conductive shells respectively cover the optical transmission apparatus and the optical receiving module of the optical-fiber connector. The front end of the electrically-conductive shell is set with an opening, and a pin is extended out from the electrical-conducting shell at the bottom portion. By the aforementioned composition of devices, the optical-isolation apparatus of the optical-fiber connector is formed.

11 Claims, 3 Drawing Sheets

US 7,537,397 B1

OPTICAL-ISOLATION APPARATUS OF OPTICAL-FIBER CONNECTOR

BACKGROUND OF THE INVENTION

1. Field of the Invention

The present invention relates to an optical-isolation apparatus of an optical-fiber connector. More particularly, the present invention relates to an optical-isolation apparatus of an optical-fiber connector being able to isolate an optical transmission module and an optical receiving module.

2. Description of the Prior Art

Nowadays, people rely on more and more channel bandwidth of data transmission and signals. Optical fiber technologies are developed as a main transmission media of network transmission with advantages of low loss, wide bandwidth, non-conductive, non-inductive, small size, small bend radius, and light in weight.

The optical fibers are widely applied in network transmission. Nowadays the electrical products are made light and in small size, thus an optical transmission module and an optical receiving module inside the optical-fiber connector are set closely. Therefore, the optical transmission module and the optical receiving module are easily to be influenced by each other optically and electrically. The aforementioned influence results in interfering stability of optical transmission and optical receiving.

Thus it can be seen that the aforementioned conventional products still have many drawbacks and are not good in design, thus the aforementioned products need improvement.

The inventor considers improvement in view of the aforementioned drawbacks of the conventional products, and develops the present invention of optical-isolation apparatus of an optical-fiber connector after a long term of research.

SUMMARY OF THE INVENTION

The primary objective of the present invention is to provide an optical-fiber connector that is able to isolate an optical transmission module and an optical receiving module inside to prevent optical and electrical influence between the optical transmission module and the optical receiving module.

Another objective of the present invention is to provide an optical-isolation apparatus of an optical-fiber connector that has simple structure, is easily to be operated, and has low cost of manufacture.

The optical-isolation apparatus of the optical-fiber connector that can achieve the aforementioned objectives mainly comprises an optical-fiber connector and two electrically-conductive shells. The optical-fiber connector is configured to be plugged with optical fibers, and the fibers of the optical fibers are connected to an optical transmission module and an optical receiving module of the optical-fiber connector respectively. The two electrically-conductive shells cover the optical transmission module and the optical receiving module respectively. The front ends of the electrically-conductive shells are set with openings for a transmission terminal of the optical transmission module and a receiving terminal of the optical receiving module respectively. A pin is extended out from the electrical-conducting shell at the bottom portion properly to exclude electrical interference (such as electromagnetic interference, EMI) out from the optical-fiber connector. By the aforementioned composition of devices, the optical-isolation apparatus of the optical-fiber connector is formed.

These features and advantages of the present invention will be fully understood and appreciated from the following detailed description of the accompanying Drawings.

DETAILED DESCRIPTION OF THE PREFERRED EMBODIMENT

Figure 1:
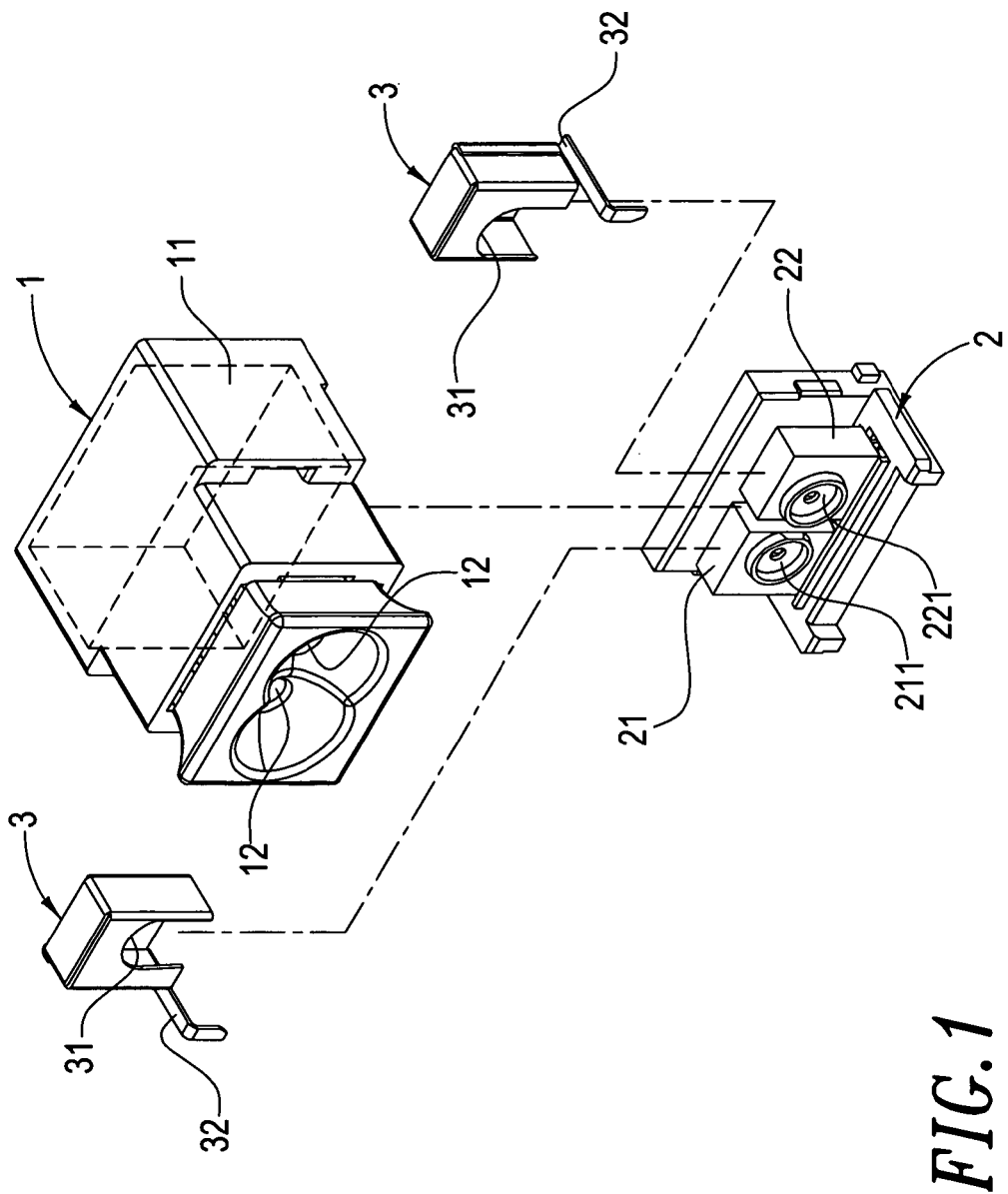
FIG. 1 illustrates a perspective explosive diagram of the optical-isolation apparatus of the optical-fiber connector of the present invention.
Figure 2:
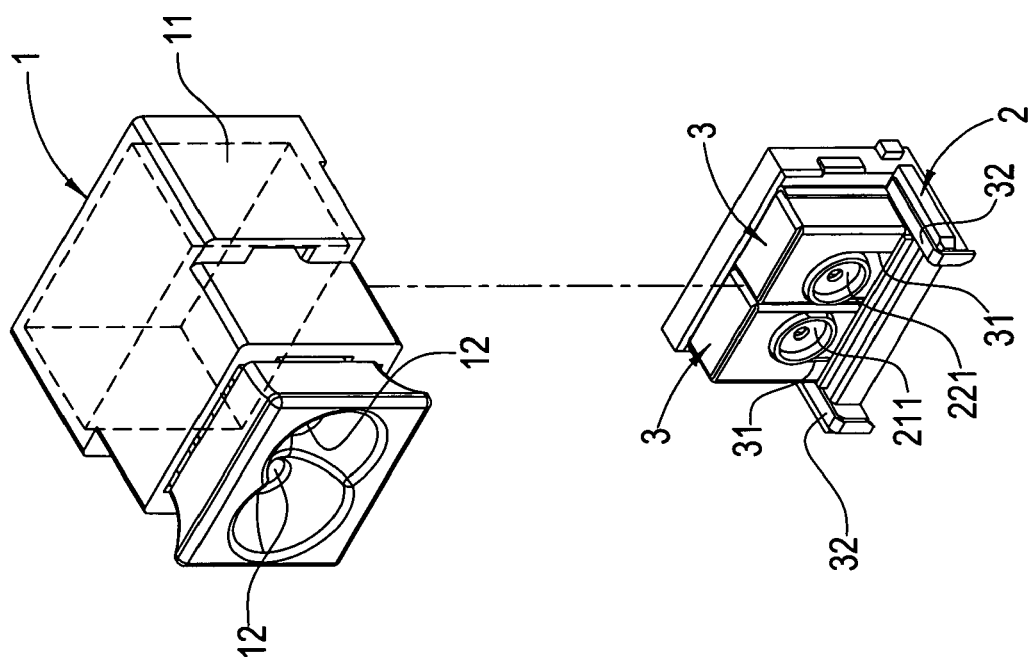
FIG. 2 illustrates a perspective diagram of portion of the optical-isolation apparatus of the optical-fiber connector of the present invention.
Figure 3:
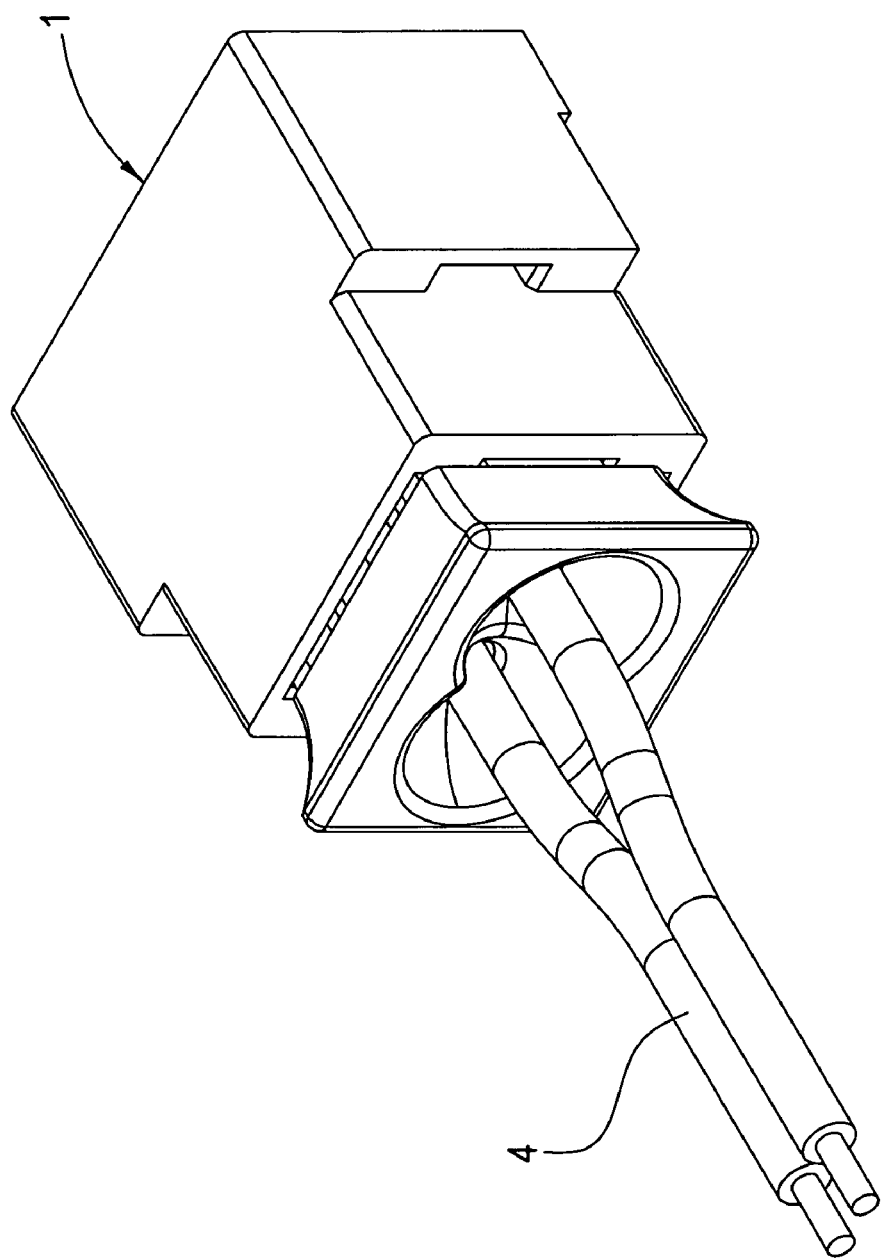
FIG. 3 illustrates a perspective diagram of the optical-isolation apparatus of the optical-fiber connector of the present invention.

FIGS. 1-3 illustrate diagrams of the optical-isolation apparatus of the optical-fiber connector of the present invention that mainly comprises:

an optical-fiber connector 1 being set with a container 11 and two optical fiber plugs 12 in front of the optical-fiber connector 1 for plugging in optical fibers 4;

a position base 2, being set with an optical transmission module 21 and an optical receiving module 22, the optical transmission module 21 having a transmission terminal 211, and the optical receiving module 22 having a receiving terminal 221; the position base 2 being contained in the container 11 of the optical-fiber connector 1;

two electrical-conducting shells 3, each electrical-conducting shell 3 being set with an opening 31 at a side, and a pin 32 being extended out from the electrical-conducting shell 3 at the bottom portion properly; the electrical-conducting shells 3 respectively covering the optical transmission module 21 and the optical receiving module 22 as shown in FIG. 2; the material of the electrically-conductive shell 3 being selected from groups of conductive plastic, copper alloy, and stainless steel; the openings 31 of the electrical-conducting shells 3 being respectively set oppositely to the transmission terminal 211 of the optical transmission module 21 and the receiving terminal 221 of the optical receiving module 2; the pin 32 being configured to exclude electrical inference out from the optical-fiber connector 1;

the two electrical-conducting shells 3 respectively covering the optical transmission module 21 and the optical receiving module 22 and the position base 2 being contained in the container 11 of the optical-fiber connector 1 to isolate the optical transmission module 21 and the optical receiving module 22. Thus the optical and electrical influences therebetween are isolated to ensure quality of optical transmission and optical receiving of the optical fibers.

The optical-isolation apparatus of the optical-fiber connector of the present invention, comparing with other conventional technologies, is advantaged as follows.

1. The present invention provides an optical-isolation apparatus of an optical-fiber connector that is able to isolate an optical transmission module and an optical receiving module inside to prevent optical and electrical influence between the optical transmission module and the optical receiving module.

2. The present invention provides an optical-isolation apparatus of an optical-fiber connector that has simple structure, is easily to be operated, and has low cost of manufacture.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An optical-isolation apparatus of an optical-fiber connector, the optical-fiber connector being set with a position base, the position base being set with an optical transmission module and an optical receiving module, the optical-isolation apparatus comprising:
   two electrically-conductive shells, each electrically-conductive shell set with an opening at a side, and a pin being extended out from the electrically-conductive shell at the bottom portion properly, wherein the electrically-conductive shells respectively cover the optical transmission module and the optical receiving module in a one-to-one manner, and the two electrically-conductive shells respectively cover the optical transmission module and the optical receiving module to isolate the optical transmission module and the optical receiving module.

2. The optical-isolation apparatus of an optical-fiber connector as claimed in claim 1, wherein the electrically-conductive shell is made of conductive plastic being able to conduct electricity.

3. The optical-isolation apparatus of an optical-fiber connector as claimed in claim 1, wherein the electrically-conductive shell is made of copper alloy being able to conduct electricity.

4. The optical-isolation apparatus of an optical-fiber connector as claimed in claim 1, wherein the electrically-conductive shell is made of stainless steel being able to conduct electricity.

5. The optical-isolation apparatus of an optical-fiber connector as claimed in claim 1, wherein the opening of the electrically-conductive shell is set oppositely to the transmission terminal of the optical transmission module.

6. The optical-isolation apparatus of an optical-fiber connector as claimed in claim 1, wherein the opening of the electrically-conductive shell is set oppositely to the receiving terminal of the optical receiving module.

7. The optical-isolation apparatus of an optical-fiber connector as claimed in claim 1, wherein the pin is configured to exclude electrical inference out from the optical-fiber connector.

8. The optical-isolation apparatus of an optical-fiber connector as claimed in claim 1, wherein the electrically-conductive shells are separately formed.

9. An optical-fiber connector comprising:
   a position base set with an optical transmission module and an optical receiving module;
   a container; and
   an optical-isolation apparatus comprising two electrically-conductive shells, each electrically-conductive shell set with an opening at a side, and a pin being extended out from the electrically-conductive shell at the bottom portion properly;
   wherein one of the two electrically-conductive shells only covers one of the optical transmission module and the optical receiving module, and the other one of the two electrically-conductive shells only covers the other one of the optical transmission module and the optical receiving module.

10. The optical-fiber connector as claimed in claim 9, wherein the position base and the optical-isolation apparatus are contained in the container.

11. The optical-fiber connector as claimed in claim 9, wherein the optical transmission module and the optical receiving module are isolated from each other by the two electrically-conductive shells.

* * * * *